United States Patent
Guevorkian et al.

(10) Patent No.: US 7,236,523 B2
(45) Date of Patent: Jun. 26, 2007

(54) METHOD FOR PERFORMING MOTION ESTIMATION IN VIDEO ENCODING, A VIDEO ENCODING SYSTEM AND A VIDEO ENCODING DEVICE

(75) Inventors: David Guevorkian, Tampere (FI); Aki Launiainen, Tampere (FI); Petri Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 681 days.

(21) Appl. No.: 10/232,924

(22) Filed: Aug. 30, 2002

(65) Prior Publication Data

US 2003/0043911 A1 Mar. 6, 2003

(30) Foreign Application Priority Data

Sep. 6, 2001 (FI) .................................. 20011769

(51) Int. Cl.
*H04N 7/12* (2006.01)
(52) U.S. Cl. ................................. 375/240.12
(58) Field of Classification Search ................ 348/699, 348/700, 416.1, 419, 405, 384, 402, 416, 348/407, 413; 375/240.12, 240.13, 240.16, 375/240.17, 240.05, 240.24; 382/236, 238, 382/232; 386/111
See application file for complete search history.

(56) References Cited

U.S. PATENT DOCUMENTS 5,652,625 A 7/1997 Chen et al.

(Continued)

FOREIGN PATENT DOCUMENTS

EP 0854439 7/1998

(Continued)

OTHER PUBLICATIONS

S. M. Jung et al., "Efficient Multilevel Successive Elimination Algorithms for Block Matching Motion Estimation," *IEEE Proceedings—Visual Image Signal Processing*, vol. 149, No. 2, Apr. 2002, pp. 73-84.

(Continued)

*Primary Examiner*—Tung Vo
*Assistant Examiner*—Behrooz Senfi
(74) *Attorney, Agent, or Firm*—Alfred A. Fressola; Ware, Fressola, Van Der Sluys & Adolphson LLP (57) ABSTRACT

A method for performing video motion estimation in video encoding, in which a video signal consists of frames comprising blocks. In the method a combined comparison value is calculated between a current video block of a frame to be encoded and at least one other video block of another frame. The current video block of the frame to be encoded comprises a set of first data values, and the at least one other video block of another frame comprises a set of second data values. Data value pairs are formed of data values from the set of first data values and equal number of corresponding data values from the set of second data values. The combined comparison value is formed by defining comparison values, each of which is defined by using data values of one data value pair of the data value pairs. Further, at least one threshold value is defined, and it is determined whether the process for defining the combined comparison value can be terminated.

34 Claims, 7 Drawing Sheets

U.S. PATENT DOCUMENTS

| | | |
|---|---|---|
| 5,838,392 A | 11/1998 | Chen et al. |
| 5,864,372 A | 1/1999 | Chen et al. |
| 6,011,870 A | 1/2000 | Jeng et al. |
| 6,031,582 A | 2/2000 | Nishikawa et al. |
| 6,154,492 A | 11/2000 | Araki et al. |
| 2004/0008779 A1* | 1/2004 | Lai et al. ............... 375/240.16 |
| 2004/0008780 A1* | 1/2004 | Lai et al. ............... 375/240.16 |

FOREIGN PATENT DOCUMENTS

| | | |
|---|---|---|
| JP | 2-145079 | 6/1990 |
| JP | 6-86272 | 3/1994 |
| JP | 6-189291 | 7/1994 |
| JP | 7-162864 | 6/1995 |
| JP | 9-18882 | 1/1997 |
| JP | H10 191352 | 7/1998 |
| JP | 2001-145109 | 5/2001 |
| WO | WO 01/95635 | 12/2001 |

OTHER PUBLICATIONS

K. Lengwehasatit et al., "Probabilistic Partial-Distance Fast Matching Algorithms for Motion Estimation," *IEEE Transactions on Circuits for Video Technology*, vol. 11, No. 2, Feb. 2001, pp. 139-152.

S. Vassiliadis et al., "The Sum-Absolute-Difference Motion Estimation Accelerator," *IEEE*, 1998, pp. 559-566.

S. H. Nam et al., "Flexible VLSI Architecture of Motion Estimator for Video Image Compression," *IEEE Transactions on Circuits and Systems—II: Analog and Digital Signal Processing*, vol. 43, No. 6, Jun. 1996, pp. 467-470.

"The Sum-Absolute-Difference Motion Estimation Accelerator," by S. Vassiliadis, E.A. Hakkennes, J.S.S.M. Wong and G.G. Pechanek, IEEE 1089-6503/98, 1998, pp. 559-566.

* cited by examiner

METHOD FOR PERFORMING MOTION ESTIMATION IN VIDEO ENCODING, A VIDEO ENCODING SYSTEM AND A VIDEO ENCODING DEVICE

CROSS REFERENCE TO RELATED APPLICATIONS

This application claims priority under 35 USC §119(e) to Finnish Patent Application No. 20011769 filed on Sep. 6, 2001.

FIELD OF THE INVENTION

The present invention relates to a method for performing video motion estimation in video encoding, in which video signal consists of frames comprising blocks, a combined comparison value is formed by using a current video block of a frame to be encoded and at least one other video block of another frame, the current video block of the frame to be encoded comprises a set of first data values, the at least one other video block of another frame comprises a set of second data values, data value pairs are formed of data values from the set of first data values and equal number of corresponding data values from the set of second data values, and the combined comparison value is formed by defining comparison values, each of which is defined by using data values of one data value pair of the data value pairs, at least one threshold value is defined, and it is determined whether the process for defining the combined comparison value can be terminated. The invention also relates to a video encoding system for performing video motion estimation in video encoding, which video signal consists of frames comprising blocks, the system comprising means for forming a combined comparison value by using a current video block of a frame to be encoded and at least one other video block of another frame, the current video block of the frame to be encoded comprises a set of first data values, the at least one other video block of another frame comprises a set of second data values, the means for forming a combined comparison value comprise input means for entering a series of at least two subsets each consisting of equal number of data value pairs of data values from the set of first data values and equal number of corresponding data values from the set of second data values, means for defining comparison values, each of which is defined by using data values of one data value pair of the data value pairs, means for defining at least one first threshold value, and means for determining whether the process for defining the combined comparison value can be terminated. The invention further relates to a video encoding device, which comprises means for encoding video signal consisting of frames comprising blocks, means for performing video motion estimation, means for calculating a combined comparison value between a current video block of a frame to be encoded and at least one other video block of another frame, said current video block of the frame to be encoded comprises a set of first data values, the at least one other video block of another frame comprises a set of second data values, and the combined comparison value is formed by defining comparison values between value pairs of the set of first data values and the set of second data values, means for defining at least one threshold value, and means for determining whether the process for defining the combined comparison value can be terminated.

BACKGROUND OF THE INVENTION

Video encoding systems are known in which an image to be encoded comprises video blocks. These blocks are then encoded and transmitted to a decoding device or stored into a storage medium. For reducing the amount of information to be transmitted, different compression methods have been developed, such as MPEG-2 (Motion Picture Experts Group). In the transmission of video images, image compression can be performed either as interframe compression, intraframe compression, or a combination of these. In interframe compression, the aim is to eliminate redundant information in successive image frames. Typically, images contain a large amount of such non-varying information, for example a motionless background, or slowly changing information, for example when the object moves slowly. In interframe compression, it is also possible to utilise motion compensation, wherein the aim is to detect such larger elements in the image which are moving, wherein the motion vector and some kind of difference information of this entity is transmitted instead of transmitting the pixels representing the whole entity. Thus, the direction of the motion and the speed of the subject in question is defined, to establish this motion vector. For compression, the transmitting and the receiving video terminals are required to have such a high processing rate that it is possible to perform compression and decompression in real time. Typically, image blocks are grouped together to form blocks. The block usually contains 16 rows by 16 pixels of luminance samples, mode information, and possible motion vectors. The block is divided into four 8×8 luminance blocks and to two 8×8 chrominance blocks. Scanning (and encoding/decoding) proceeds block by block, conventionally from the top-left to the bottom-right corner of the frame. Inside one block the scanning (and encoding/decoding) order is from the top-left to the bottom-right corner of the block.

In MPEG-2 compression, an image is Discrete Cosine Transform (DCT)-coded in blocks so that the block size is 8×8 pixels. The luminance level to be transformed is in full resolution. Both chrominance signals are subsampled, for example a field of 16×16 pixels is subsampled into a field of 8×8 pixels. The differences in the block sizes are primarily due to the fact that the eye does not discern changes in chrominance equally well as changes in luminance, wherein a field of 2×2 pixels is encoded with the same chrominance value.

The MPEG-2 defines three frame types: an I-frame (Intra), a P-frame (Predicted), and a B-frame (Bi-directional). The I-frame is generated solely on the basis of information contained in the image itself, wherein at the receiving end, this I-frame can be used to form the entire image. The P-frame is formed on the basis of a preceding I-frame or P-frame, wherein at the receiving stage the preceding I-frame or P-frame is correspondingly used together with the received P-frame. In the composition of P-frames, for instance motion compensation is used to compress the quantity of information. B-frames are formed on the basis of the preceding I-frame and the following P- or I-frame. Correspondingly, at the receiving stage it is not possible to compose the B-frame until the corresponding I-frame and P- or I-frame have been received. Furthermore, at the transmission stage, the order of these P- and B-frames is usually changed, wherein the P-frame following the B-frame is received first, which accelerates the reconstruction of the image in the receiver.

Of these three image types, the highest efficiency is achieved in the compression of B-frames. It should be mentioned that the number of I-frames, P-frames and B-frames can be varied in the application used at a given time. It must, however, be noticed here that at least one I-frame must be received at the receiving end, before it is possible to reconstruct a proper image in the display device of the receiver.

The aim of the motion estimation is to find such a block (a reference block) within a search area of some reference frame in a video sequence that is most similar to a given block within the current frame (block under examination). Among the variety of motion estimation algorithms, the most popular are those based on block matching where a sum of absolute differences (SAD) is used as the similarity criterion between frame blocks. Given two ordered sets of data $X=\{x_1, \ldots, x_K\}$ and $Y=\{y_1, \ldots, y_K\}$, the value of the SAD is defined as:

$$SAD(X, Y) = \sum_{i=1}^{K} |x_i - y_i|, \quad (1)$$

In some publications SAD is defined as the sum $SAD(X, Y)$ divided by the number K of its addends. In that case it may also be called mean absolute error (MAE). Since in the most of the cases K is a power of two, these two definitions are substantially equivalent from the implementation point of view because the later one may simply be obtained by shifting the value of the former one by certain number of bits.

Figure 5:
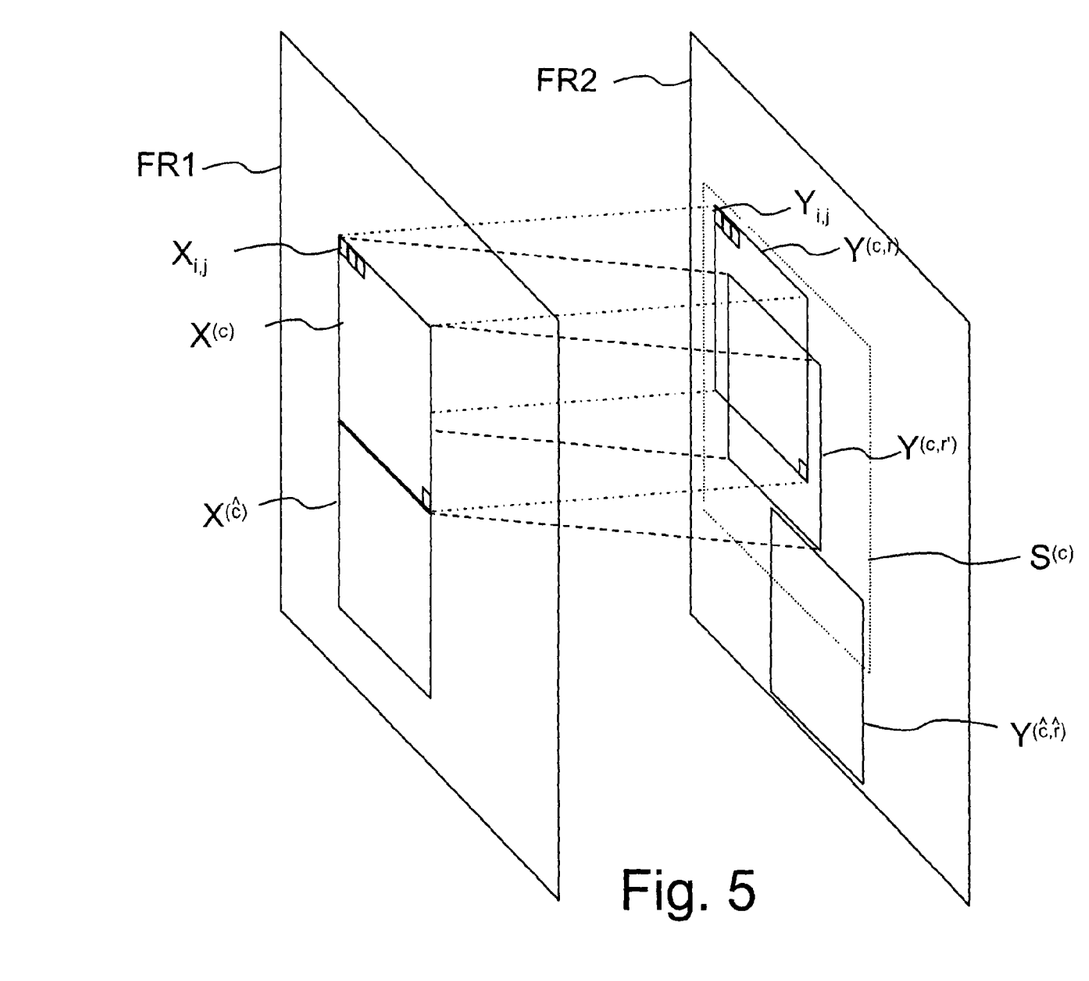
FIG. 5 shows a method for performing video motion estimation in video encoding.

In a video encoding context, the SAD is computed between every (16×16) block $X^{(c)}$ of every current interframe (in practice almost every frame of a video sequence) and a plurality of (16×16) blocks $Y^{(c,r)}$, $Y^{(c,r')}$ within a search area $S^{(c)}$ of one or more reference frame(s) (see FIG. 5). The blocks $Y^{(c,R)}$ that corresponds to the minimum SAD value among SADs between $X^{(c)}$ and blocks $Y^{(c,r)}$, $Y^{(c,r')}$ within the search area $S^{(c)}$ is then used to form a motion information. Thus, SAD is applied many times and even a smallest improvement in the execution time of one SAD operation leads to significant savings in total video processing time. Naturally, on the other hand, the hardware utilized for computation of SAD should not be too large or power consuming especially in portable/wireless video processing applications.

There are many different motion estimation algorithms utilizing different search strategies in order to reduce the number and/or the size of SAD operations with possibly less degradation in the quality of the encoded video. They can roughly be grouped into two categories: data independent search where the choice of the next pair of X and Y blocks does not depend on the SAD value obtained at the previous step, and data dependent search. Normally, the data dependent search strategies require less SAD operations to be implemented. However, most of hardware implementations are based on data independent motion estimation algorithms due to simplicity of organizing regular data movements typical to such algorithms. Common to data dependent strategies is that there are several options to choose the next pair of X and Y blocks and which pair will be chosen depends on the current SAD value.

According to recent investigations different motion estimation algorithms consume approximately 40%–80% of the total video encoding time when implemented in a General-Purpose Processor (GPP). The basic operation in the block matching motion estimation algorithms is the SAD, which is applied many times during the video encoding process. In typical fast motion estimation algorithms, SAD computation is repeated approximately 30 times for almost every block (usually, of the size (16×16)) within the video sequence. Even for a 15 frames per second QCIF resolution (Quarter Common Intermediate Format) video sequences this would mean at least 44550 256-point (16×16) SAD computations per second. In a purely software implementation on, e.g., ARM9E microprocessor, which is a typical microprocessor in embedded systems, computing one 256-point SAD takes several thousands of clock cycles. This means that even hundreds of millions of cycles per second are spent only for motion estimation in a software implementation of video encoding.

Due to the importance of the problem, many motion estimation devices have been reported in the literature recently. One class of the architectures for SAD computation involved in such devices are cascade-connected architectures. An example of such architecture is disclosed in the patent U.S. Pat. No. 6,154,492.

Figure 6:
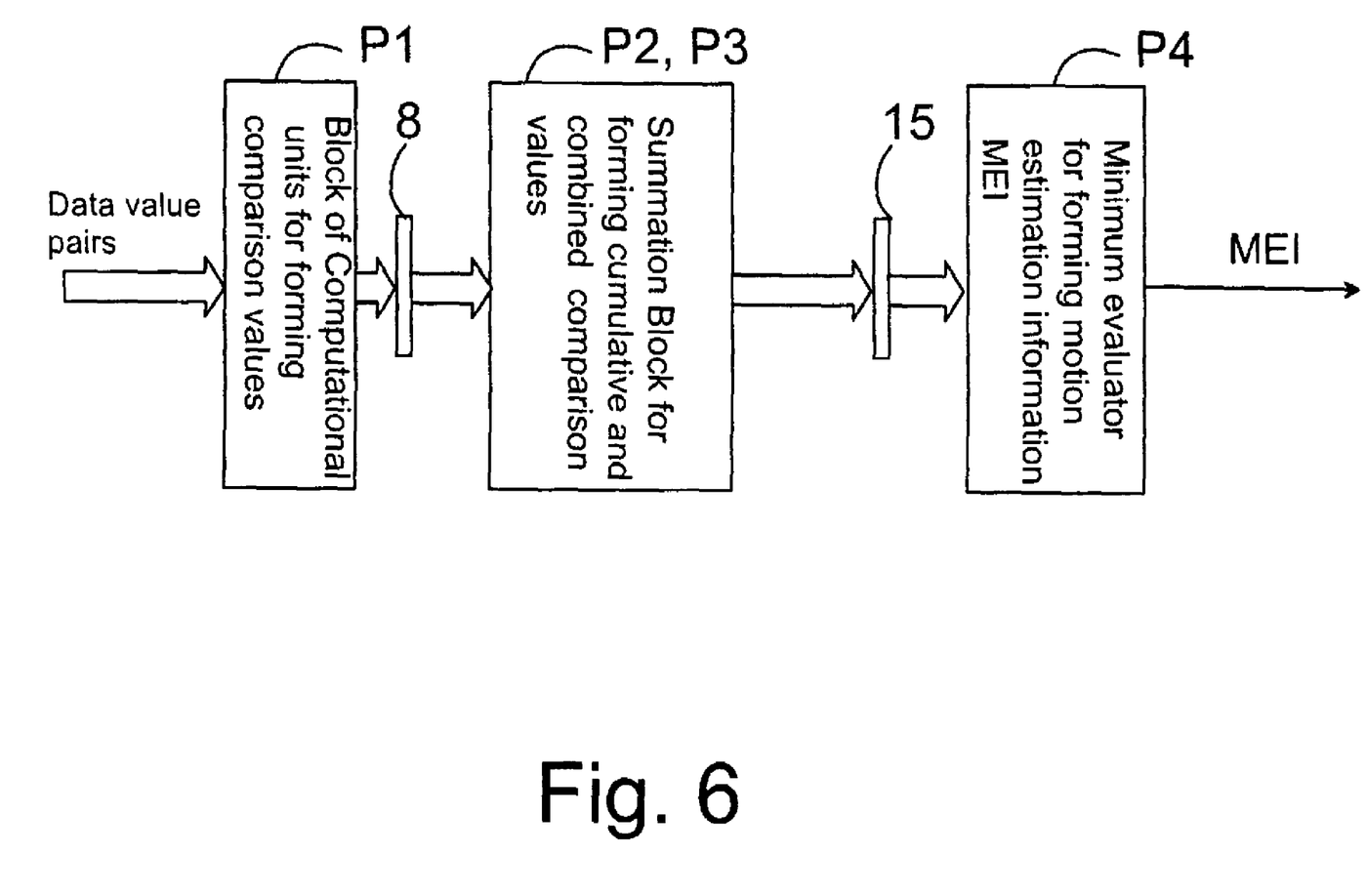
FIG. 6 shows a general structure of prior-art iterative/parallel accumulation SAD architectures.

Another type of architectures are those which may, in general, be described according to the FIG. 6 and may be referred to as "parallel/iterative accumulation SAD architectures". Examples of such architectures are found in e.g. U.S. Pat. No. 5,864,372 and U.S. Pat. No. 5,652,625 and in the paper "The sum-absolute-difference motion estimation accelerator" by S Vassiliadis, E. A. Hakkennes, J. S. S. M. Wong. And G. G. Pechanek published in Proceedings of Euromicro Conference, vol. 2, in 1998 (pages 559–566). In these architectures, some comparison values which are representatives of the absolute difference between every pair of data values (one from a current block and another from a reference block) are calculated at every step within a block of computational unit(s). These values are then one-by-one or portion-by-portion (iteratively), or all at once (in parallel) accumulated within a summation block which may have an internal feedback. After accumulating comparison values of all the pairs for given two blocks the SAD between these two blocks are obtained. SADs obtained between a given block $X^{(c)}$ and a plurality of blocks $Y^{(c,r)}$ within a search area $S^{(c)}$ are then analysed within the minimum evaluator block and the block producing the smallest SAD is selected to produce the motion estimation information.

In the practical use for motion compensation in video encoding, if the SAD value is too large it is not in an interest. Thus accumulation means within SAD architectures may be implemented with a lower precision (bit-width) than that for the correct SAD value in the worst case. While larger SAD values would then incorrectly be computed, normally this does not affect to the motion estimation result.

Some interrupt mechanisms have been introduced e.g. in U.S. Pat. No. 6,154,492 to be used in connection with SAD calculation means. The patent publication discloses a motion vector detection apparatus, which comprises cascade-connected processor elements. The processor elements calculate the absolute value of the difference between each of a plurality of pixels which compose a picture and a corresponding one of the same number of pixels included in a block, and also performs cumulative addition of the difference absolute values in the block. These operations are performed for each of the blocks within the predetermined search area. A comparative device repeatedly compares the cumulative addition values of two blocks obtained sequentially in the processor element at the final stage, and selects the smaller one of the cumulative addition values. A subtracter compares the smaller cumulative addition value with a setting value. When the smaller cumulative addition value is smaller than the setting value, a control circuit halts the supply of clock signals to the processor elements and the comparison device, so as to halt the entire operations of the apparatus. Since only smaller SAD values are important for determining the motion vectors, the larger SAD values may be incorrectly computed. This means that the precision of the functional units within the apparatus may have smaller precision than what is necessary for correct SAD computation in the worst case. This clearly leads to additional savings in silicon area and in power consumption. However, in this solution only a part of the architecture is halted thus partially saving the power but not the execution time. In fact, the architecture of U.S. Pat. No. 6,154,492 is constructed from K=256 processing elements each consisting of three adders. Such architecture does not appear feasible at the current state of technology or at least it appears to be too large for incorporating into mobile video encoding systems. In addition, this architecture supports only regular, data independent search strategies for motion estimation since it is heavily pipelined (256 pipeline stages) and the full interruption of the architecture would mean full pipeline reload.

There are several situations in the SAD computation for motion estimation where the calculation of a SAD between two given blocks $X^{(c)}$ and $Y^{(c,r)}$ may be terminated before completing the calculations and a new calculation of the sum of absolute differences between $X^{(c)}$ and another block $Y^{(c,r')}$ from the search area $S^{(c)}$ may be started substantially immediately after the early termination. Examples of such situations are the cases where in the middle of calculations for the SAD between $X^{(c)}$ and $Y^{(c,r)}$ a temporary SAD value is obtained which already exceeds a predetermined threshold value or an earlier obtained value of the SAD between $X^{(c)}$ and some block $Y^{(c,r'')}$ within the search area $S^{(c)}$. In some other situations the search for a reference block within a given search area $S^{(c)}$ may be terminated and motion compensation information for $X^{(c)}$ may be formed before completing the process in the normal way. An example of such situation is the case where an SAD value between two blocks $X^{(c)}$ and $Y^{(c,R)}$ (not shown) is smaller than another predetermined threshold value. Therefore integrating some interrupt mechanisms into devices for motion estimation allowing pre-termination of the SAD computation and/or the reference block search would be rather advantageous.

SUMMARY OF THE INVENTION

It is an aim of the present invention to provide an improved method, system and apparatus for performing motion estimation in video encoding. The invention is based on the idea of incorporating interrupt mechanisms into iterative/parallel accumulation SAD architectures allowing the termination of the calculation of the sum of absolute differences and/or the search for a reference block in some circumstances where the further computations are useless or undesired. In some situations a new calculation of the sum of absolute differences between the given block $X^{(c)}$ and a new block $Y^{(c,r')}$ from the search area $S^{(c)}$ is started substantially immediately after the early termination. In some other situations the search for a reference block within the given search area $S^{(c)}$ is terminated and motion compensation information for the given block $X^{(c)}$ will be formed. This is achieved by examining the intermediate SAD values to determine if they already are too high to interrupt the SAD calculation between said current block $x^{(c)}$ and said other block $Y^{(c,r')}$ as well as by examining the final SAD values to determine if they are already enough low to terminate the search for a given block $X^{(c)}$ within the given search area $S^{(c)}$. The method according to the present invention is primarily characterized in that the method comprises at least:

a calculation step for forming at least one sub-set of comparison values each consisting of at least one comparison value an accumulation step for forming a signal indicative of the current cumulative comparison value, which is updated iteratively using the at least one sub-set of comparison values obtained at the calculation step, a decision step performing the determination whether the process can be terminated by comparing at least one signal with at least one threshold value, and termination and initialisation of a new process for defining the combined comparison value according to the decision made at the decision step.

The video encoding system according to the invention is primarily characterized in that the system comprises at least:

calculation means for forming at least one sub-set of comparison values each consisting of at least one comparison value, accumulation means for forming a signal indicative of the current cumulative comparison value, which is updated iteratively using the at least one sub-set of comparison values obtained at the calculation step, decision means for determining whether the calculation process can be terminated comprise means for comparing at least one signal with at least one threshold value, and means for terminating the current process and initialising of a new process for defining the combined comparison value according to the decision made at the decision step.

The video encoding device according to the invention is primarily characterized in that the device comprises at least:

calculation means for forming at least one sub-set of comparison values each consisting of at least one comparison value, accumulation means for forming a signal indicative of the current cumulative comparison value, which is updated iteratively using the at least one sub-set of comparison values obtained at the calculation step, decision means for determining whether the calculation process can be terminated comprise means for comparing at least one signal with at least one threshold value, and means for terminating the current process and initialising of a new process for defining the combined comparison value according to the decision made at the decision step.

The present invention provides significant advantages as compared with those prior art hardware solutions which do not provide early termination mechanisms and/or do not use iterative accumulation means of a lower bit-width than is necessary for largest possible SAD value. The examination of the blocks within the search area can be performed faster because the calculation of SAD values between the current block and one reference block can be preterminated and the examination of the next block can be started almost immediately when it is noticed that the reference block is not suitable for the motion estimation. Furthermore, SAD value computations between a given current block, say $X^{(c)}$, and a plurality of reference blocks, say $Y^{(C,R)}$, can be preterminated, if the SAD value between the current block $X^{(c)}$ and a given reference block $Y^{(C,R0)}$ was tested to be reasonably small enough. Therefore useless computation process can be avoided. These modifications lead to major improvements in saving the execution time and power consumption since the cases where useless computation is determined occur quit often in the most of the motion estimation algorithms. The possibility of using low-precision accumulating means significantly reduces the size and execution time of the architectures proposed in this invention. Reduction of the accumulator's size also means that higher speed architectures having more parallel computational units are becoming practically feasible.

Advantages of the proposed termination mechanism compared to those used in U.S. Pat. No. 6,154,492 to improve the SAD calculation means are e.g. as follows:

In an advantageous embodiment of the present invention computing the SAD for the next pair of blocks is started when unnecessary computation is determined, thus saving both the execution time and power consumption. The interrupt mechanism of U.S. Pat. No. 6,154,492 halts only a part of the architecture and after a time when computations for unnecessary SADs could have already been performed.

The present invention may support as regular as well as irregular data dependent search strategies in motion estimation due to only a restricted pipelining being employed. In a preferred embodiment, essentially, two (out of four) pipeline stages must be reloaded after the termination. The architecture of U.S. Pat. No. 6,154,492, is oriented only to regular, data independent motion estimation algorithms.

BRIEF DESCRIPTION OF THE DRAWINGS

In the following the invention will be described in more detail with reference to the appended drawings, in which.

DETAILED DESCRIPTION OF THE INVENTION

In the following, the invention will be described for a general case assuming K pairs of n-bit input data even though in the video encoding context, K=256, n=8 is the most common case. It should be noted that the sum of absolute differences might be used not only in video encoding but also in other applications such as medical imaging, radar imaging, and other signal processing tasks where pattern recognition is performed in real time (Electrocardiogram (ECG) devices, implantable cardioverter-defibrillator (ICD) devices recording the function of the heart, sound processing, etc).

FIG. 5 shows the principle of the method for performing video motion estimation in video encoding. In FIG. 5 only two frames FR1, FR2 are shown for clarity. The frame FR1 to be encoded comprises one or more blocks $X^{(c)}$ which comprise pixel values $X_{i,j}$ of which only a few are shown. In the reference frame FR2 a search area $S^{(c)}$ is defined. The search area $S^{(c)}$ defines the area in which the comparison between the current block $X^{(c)}$ of the frame FR1 to be encoded and the reference block $Y^{(c,r)}$ of the reference frame FR2 is performed. However, it is obvious that in some embodiments it is possible to use the whole area of the reference frame FR2 as the search area $S^{(c)}$. In the method a reference block $Y^{(c,r)}$, $Y^{(c,r')}$ is selected, one by one, for comparison with the current block $X^{(c)}$. The search process will be continued until the whole search area $S^{(c)}$ is examined or if another possibly defined condition for terminating the search is fulfilled. In the following the search will be described in more detail.

Figure 7:
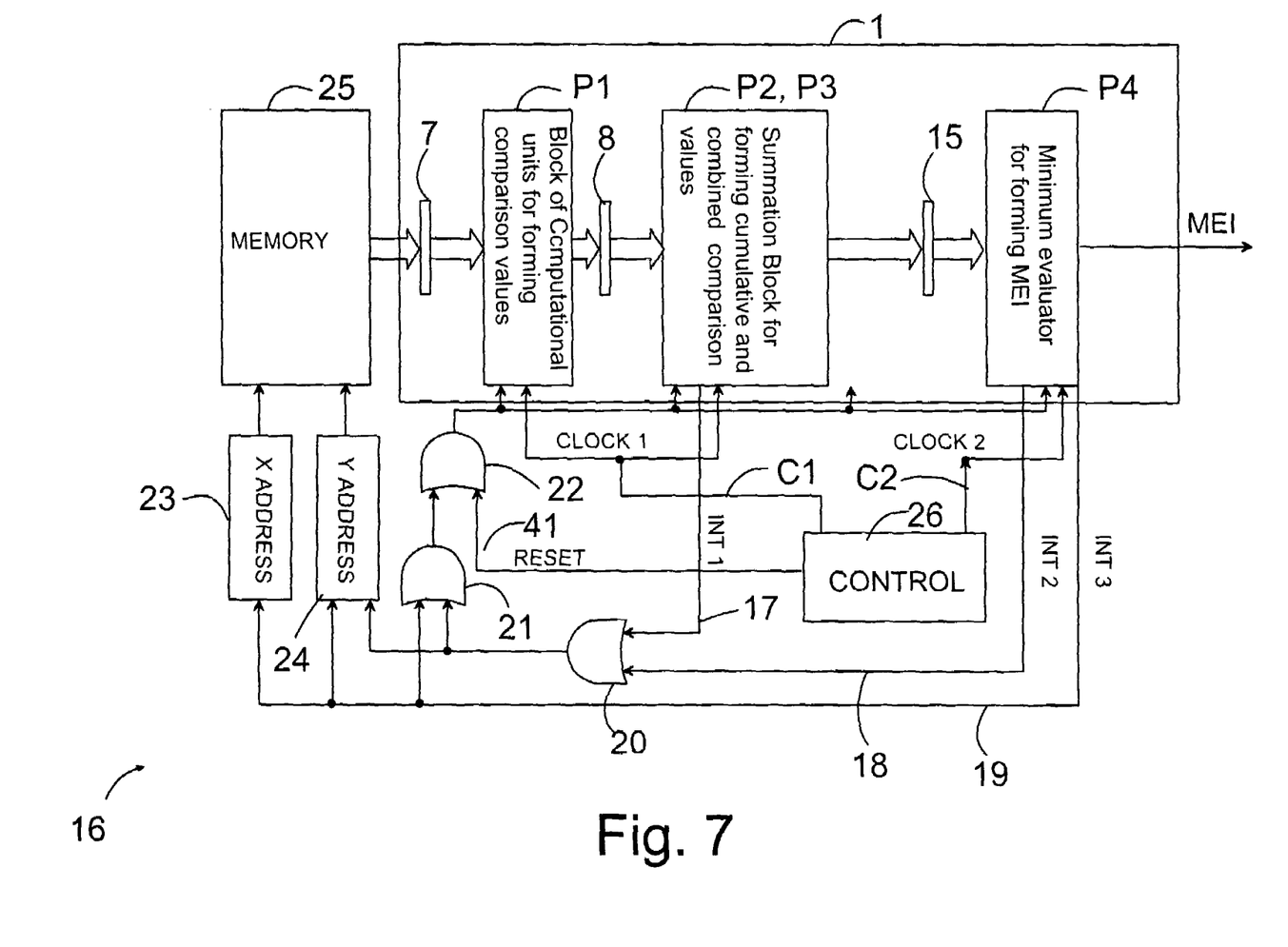
FIG. 7 shows the general structure of iterative/parallel accumulation SAD architectures with integrated interrupt mechanisms according to an advantageous embodiment of the present invention.

FIG. 7 shows the general structure of iterative/parallel accumulation SAD architectures of FIG. 6 with integrated interrupt mechanisms according to an advantageous embodiment of the present invention. It comprises e.g. memory means 25 for storing image data, a SAD calculation means 1, and control circuitry. The SAD calculation means 1 comprises means P1 for forming comparison values, means P2, P3 for forming cumulative and combined comparison values by using the comparison values, and means P4 for evaluating the minimum SAD value and for forming motion estimation information MEI.

Figure 1:
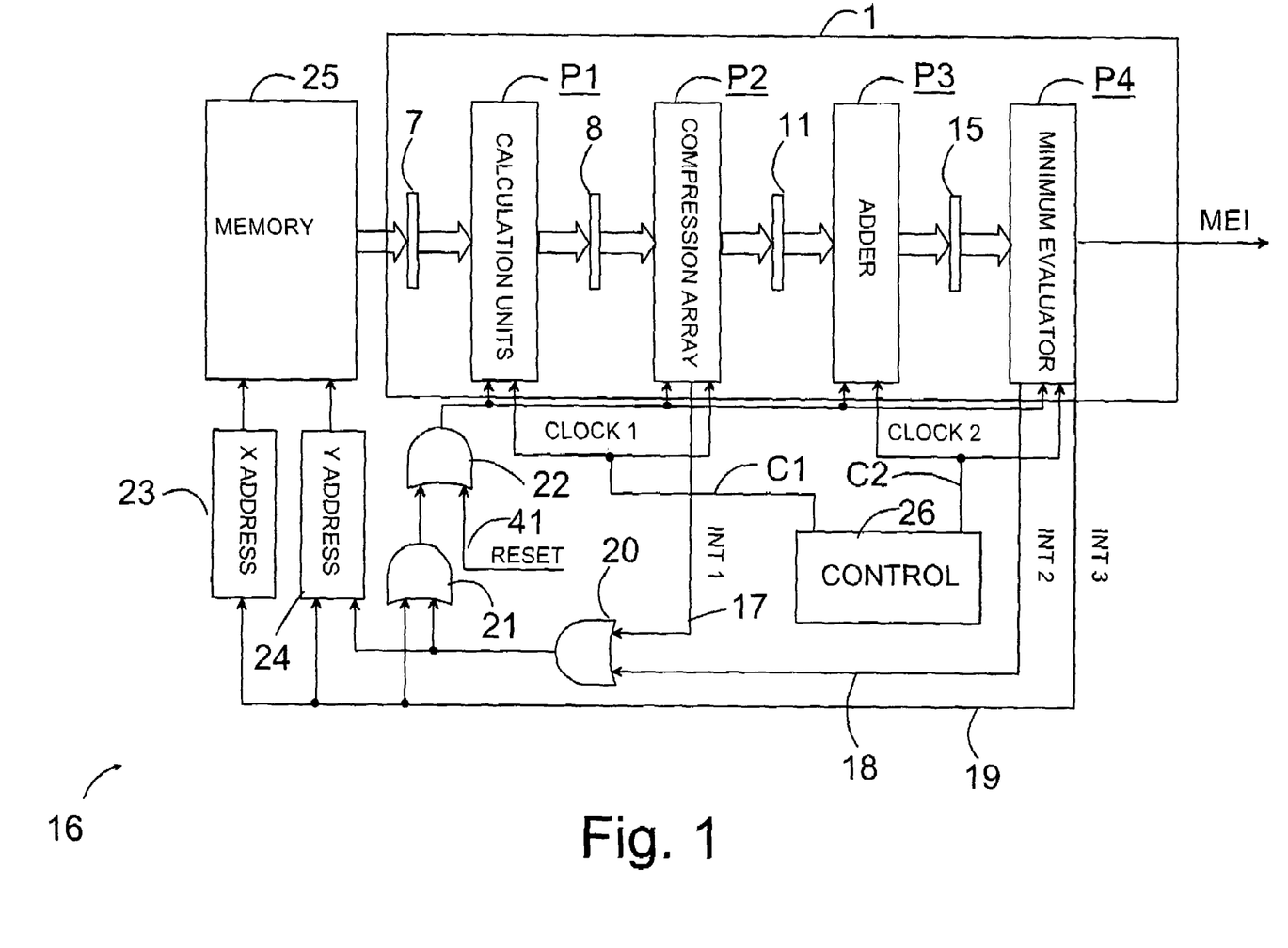
FIG. 1 shows, in a reduced block diagram, a motion estimation block according to an advantageous embodiment of the invention.
Figure 2:
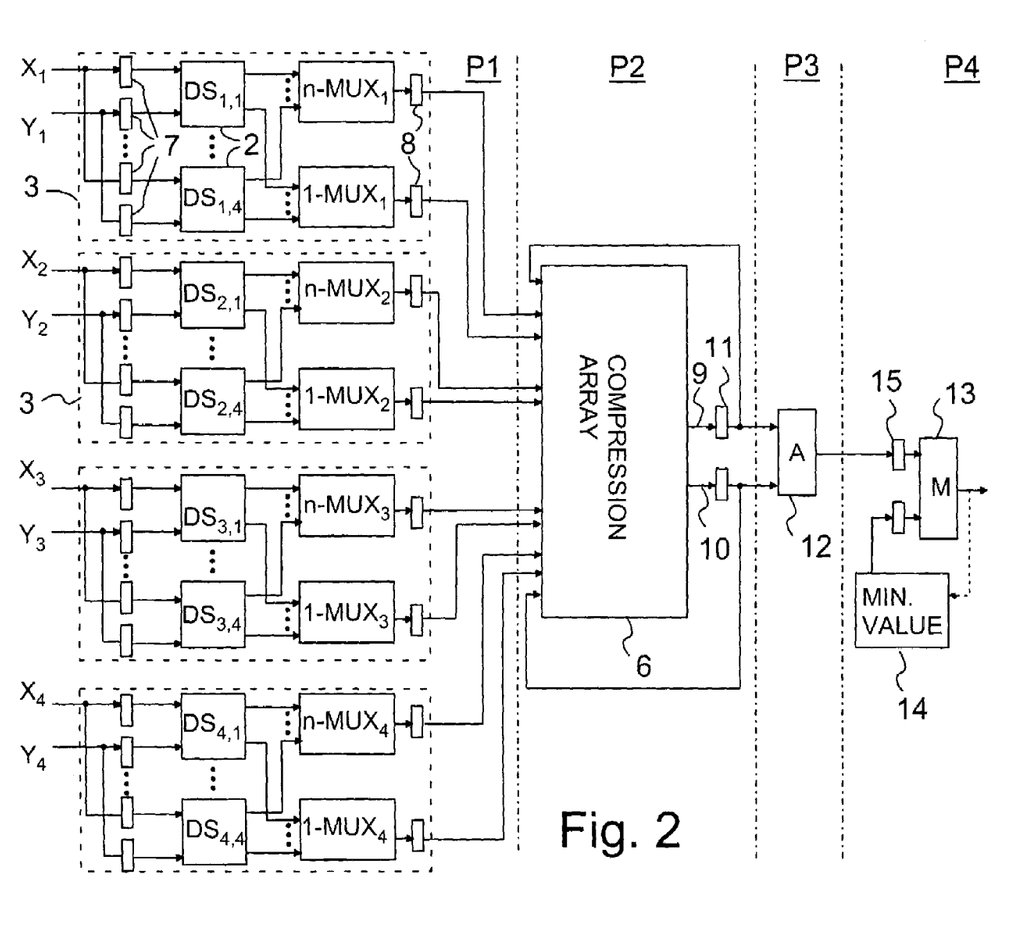
FIG. 2 shows, in a reduced block diagram, a SAD calculation means of the motion estimation block according to an advantageous embodiment of the invention.

For a detailed description, however, the invention will be described with the help of FIG. 1 which is a more detailed example of the general structure of the iterative/parallel accumulation SAD architecture of FIG. 7. This example illustrates the method of the present invention by incorporating early termination mechanisms into the architecture disclosed in the parallel application by the applicant. FIG. 1 shows, in a reduced block diagram, a motion estimation block 16 according to an advantageous embodiment of the invention and FIG. 2 shows in a reduced block diagram, an advantageous embodiment of a SAD calculation means 1 of the motion estimation block 16 of FIG. 1. The SAD calculation means 1 comprises four pipeline stages P1, P2, P3, P4 and buffers 7 in the input of the first pipeline stage P1 and buffers 8, 11, 15 between consecutive pipeline stages P1, P2; P2, P3 and P3, P4. In this advantageous embodiment of the present invention there are three different interrupt signals which can be generated for terminating the SAD calculation. The first interrupt signal 17 is generated by the second pipeline stage P2 and it simply constitutes the carry output of the summation circuit of the second pipeline stage P2. The second interrupt signal 18 and the third interrupt signal 19 are generated by the fourth pipeline stage P4. The second interrupt signal 18 is the output of comparison means within minimum evaluator 13 which is set high when an intermediate SAD value exceeds the current minimum value. The third interrupt signal 19 is the output of another comparison means within minimum evaluator 13 which is set high when a complete intermediate SAD value is below a predetermined threshold value. It should be noted, however, that the invention is not restricted to applications in which all the three interrupts are in use, but the invention can also be applied using only one or two of the interrupts. It is also possible that more than three different interrupts can be in use in devices in which the present invention is applied.

The control circuitry comprises e.g. OR gates 20, 21, 22, X data address generator 23, Y data address generator 24 and clock circuitry to control the operation of the motion estimation block 16. The first interrupt signal 17 is coupled via the first OR gate 20 to a first signal 17 is also coupled via the second 21 and the third OR gate 22 to generate a reset signal to the SAD calculation means 1. The second interrupt signal 18 is coupled via the first OR gate 20 to a first control input of an Y data address generator 24. The second interrupt signal 18 is also coupled via the second 21 and the third OR gate 22 to generate the reset signal to the SAD calculation means 1. The third interrupt signal is coupled via the second OR gate 21 to a control input of an X data address generator 23 and to a second control input of an Y data address generator 24.

In the following, the operation of the motion estimation block 16 of FIG. 1 will be described in more detail. First, block data sets $X=\{x_1, \ldots, x_K\}$ and $Y=\{Y_1, \ldots, Y_K\}$ are entered, portion by portion, into the first pipeline stage P1 from e.g. the memory 25. In this advantageous embodiment of the invention the first pipeline stage comprises four groups 3 of computational units 2 and each group comprises four computational units 2. In a more general case the first pipeline stage P1 comprises s groups 3 and each group comprises p computational units 2. The parameters s and p are selected such that m=sp and both parameters s, p are positive integers, i.e. s, p 1. Each computational unit 2 of a group 3 shares the same inputs $X_1, Y_1; X_2, Y_2; X_3, Y_3; X_4, Y_4$ but at different clock cycles. The pair of inputs $(X_i, Y_i)$, i=1, ... 4, of the SAD calculation means 1 is connected to the pair of inputs $(X_{ij}, Y_{ij})$ of every computational unit $DS_{ij}$, j=1, ... 4, of the $i^{th}$ group through the input registers 7. Every of these input registers 7 of the first pipeline stage are open only during one out of every 4 operating cycles of the SAD calculation means 1. This way, at every operating step, each input pair $(X_i, Y_i)$, i=1, ... 4, of the SAD calculation means 1 is actually connected to the pair of inputs $(X_{ij}, Y_{ij})$ of only one computational unit while the other connections are inactive since the corresponding input registers 7 of the first pipeline stage are closed for writing. The input registers 7 of the first pipeline stage at the inputs of the first computational units $DS_{i,1}$ of every group i=1, ... , 4 are open during the first of every 4 operating steps, the input registers of the first pipeline stage at the inputs of the second computational units $DS_{i,2}$ of every group are open during the second of every 4 operating steps, etc. The outputs of the computational units 2 of the groups 3 are connected to inputs of two multiplexers 4, 5 such that the n-bit output of the computational unit 2 is connected to one of the n-bit inputs of the first multiplexer 4 and the 1-bit output of the computational unit 2 is connected to one of the 1-bit inputs of the second multiplexer 5. The first multiplexers 4 comprise p n-bit inputs and one n-bit output. Respectively, the second multiplexers 5 comprise p 1-bit inputs and one 1-bit output. The computational units 2 of one group 3 operate with a time offset of approximately one operating step having the duration $T_P$ which now approximately equals to the delay of the compression array 6. Respectively, sign and difference data are formed at the outputs of computational units 2 also with the time offset of approximately one operating step. Output pairs of all the computational units 2 of one group 3 are connected to a single pair of inputs of the compression array 6 through multiplexers 4, 5 so that at every operating step the computational unit 2 which have just computed the sign and difference data is connected to the compression array 6 through multiplexers 4, 5 and output buffers 8. Thus the compression array 6 receives and accumulates new sign and difference data portion at every operating step alternating between different computational units 2 of every group 3.

The second pipeline stage P2 is a compression array 6 having s inputs from the first pipeline stage P1 and two feedbacks from its sum 9 and carry outputs 10. The compression array 6 receives all the difference data and sign data, which are added together to produce two (sum and carry term) rows of compressed difference and sign data. The compression array 6 updates the values of its sum and carry terms at every operating step by accumulating the sign and difference data at the outputs of buffers 8. After the accumulation of the sign and difference data for all value pairs is performed, the output of the compression array 6 comprises the final compressed difference and sign data which are accumulated by an adder 12 which constitutes the third pipeline stage P3.

The compression array 6 of the second pipeline stage P2 is advantageously a carry-save adder tree constructed either from full adders (FA) or 4/2-ratio compressors which are known as such. Different constructions of the tree are possible. In order to provide correct SAD computation in the worst case the bit-width (precision) of the tree must be $(n+\log_2 K-1)$-bit, where n is the number of bits in input data, and K is the number of input data samples within a block. For example, if 8-bit input values are used and the size of the block is 256, the bit-width of the compression array 6 should be 15-bits in order to obtain the sum and carry terms of the largest possible SAD value correctly.

The second pipeline stage P2 also has output registers 11 which temporarily store the values of the sum and carry term calculated by the compression array 6. This is necessary for proper control of the synchronized pipeline clock timing. The output registers 11 are also used to store the sum and carry term and to feed these terms back to input of the compression array 6 to be summed in the subsequent operation step.

As mentioned above, the third pipeline stage P3 comprises an adder 12 which adds the calculated sum and carry terms to produce the sum of absolute differences between the current block and the current reference block. It is also possible that the adder 12 calculates e.g. the mean absolute error (MAE) by dividing the sum of absolute errors SAD (X,Y) by the number K of its addends as was described earlier in this description.

The fourth pipeline stage is a minimum evaluator 13 comprising a comparison means (not shown) and means 14 for storing minimum SAD value. In the beginning of the motion estimation for a given current block $X^{(c)}$ the minimum SAD value is set to an initial value (normally, a large value, for example, the greatest possible value for the minimum SAD value). Then the comparison means of the minimum evaluator 13 compares the latest SAD value formed at the adder 12 of the third pipeline stage with the stored minimum SAD value and, if the latest SAD value is smaller, then the so far found minimum SAD value is replaced with that value. After performing all SAD computations for a given current block $X^{(c)}$, the minimum SAD value is used to form the motion estimation information MEI for $X^{(c)}$.

A reference is made to the co-pending application in its entirety by the same applicant, in which the above described embodiment of the SAD calculation unit 1 is described in more detail.

The following two embodiments of the invention are based on an observation that in a motion estimation process only sufficiently small SAD values are important. In the practical use for motion compensation in video encoding, if the SAD value is too large it is not of interest. Therefore, it is not necessary to calculate SAD values that are larger than a predetermined threshold correctly. This may be used twofold: to reduce the bit-width of the summation and comparison means as well as to terminate calculation of an SAD when it is going to be larger than the predetermined threshold value.

In an advantageous embodiment of the present invention, the compression array 6 of the second pipeline stage P2, the adder 12 of the third pipeline stage P3, and the minimum evaluator of the fourth pipeline stage P4 of the SAD calculation means 1 can be implemented with a lower precision than necessary to obtain the largest possible SAD value correctly. That is, the compression array 6 may be implemented with lower than $(n+\log_2 K-1)$-bit precision, and the adder 12 and the comparison means of the minimum evaluator 13 may be implemented with lower than $(n+\log_2 K)$-bit precision, which precisions are needed in order to provide correct SAD computation in the worst case. Here n is the number of bits in input data, and K is the number of input data samples within a block as before. For example, if 8-bit input values are used and the size of the block is 256, the bit-width of the compression array 6 may be lower than 15-bits, for example 7-bits, and the bit-width of the adder 12 and the comparison means within the minimum evaluator 13 may be lower than 16-bits, for example 8-bits. While larger SAD values would then be incorrectly computed, normally this does not affect to the motion estimation result. This embodiment may lead to significant reduction in the size and power consumption of the SAD computation means 1. Reduction in the size may also mean that faster means involving more computational units in the first pipeline stage become practically feasible.

In another advantageous embodiment of the present invention, the carry term of the temporary sum of differences of already processed data formed by the compression array 6 is examined to determine if it has exceeded a predetermined first threshold value. In this advantageous embodiment this can be performed by examining the status of the carry output 10 of the second pipeline stage P2. In fact, the most significant bit of the carry output 10 is coupled to the first OR gate 20 which then acts as the first interrupt signal 17. Therefore, if the most significant bit of the carry output 10 is at logical one state, the first interrupt signal 17 is generated to inform the SAD calculation means 1 that the intermediate SAD value is over the predetermined first threshold value, wherein it is not necessary to continue the calculation of the SAD value between the current block and the reference block. The active state of the first interrupt signal (e.g. logical 1 state) sets the output of the first OR gate 20 to active state. This is coupled to the first control input of an Y data address generator 24 and to an input of the second OR gate 21, as was mentioned previously in this description. Then, the Y data address generator 24 detects the change of the logical state of the first control input of the Y data address generator to the active state and changes the Y data address to point to another, still unexamined, block of the reference frame. Also the pipeline stages P1, P2, P3, P4 of the SAD calculation means, 1 are reset to their initial states. The motion estimation block 16 will then begin to calculate the SAD value between the current block and the next reference block of the reference frame.

In the above described embodiment the first threshold value is determined by the bit-width of the compression array (calculation accuracy). If the temporary sum of absolute differences value of the compression array 6 exceeds the value of the predetermined first threshold value at some accumulation step, the SAD computation process for the given pair of blocks $X^{(c)}$ and $Y^{(c,r)}$ will be terminated. For example, if 8-bit input values are used and the size of the block is 256, the bit-width of the compression array 6 should have to be 15-bits in order to obtain the largest possible SAD value correctly. However, in the preferred embodiment the width $\lceil \log_2 TH1 \rceil$ will be used where TH1 is the first threshold value. This means that if the difference value is greater or equal than $2^{\lceil \log_2 TH1 \rceil}$, the most significant bit of the carry output is set high. This embodiment has the advantage that no special comparison means are needed. In some other advantageous embodiments comparison means, for example a comparator (not shown), can be used to compare the temporary sum of absolute differences with the first threshold value and to produce the first interrupt signal 17, if the absolute value of the difference data is greater than the first threshold value.

It should be noted here that the memory 25 and the X and Y data address generators 23, 24 depicted on FIG. 1 may be as internal as well as external to the motion estimation block 16. The interrupt mechanisms described in this description may be functional in both these cases.

The SAD calculation means 1 which is described in FIG. 2 is one, non-restrictive, embodiment of the SAD calculation means, but also other kinds of SAD calculation means 1, for example, those generally depicted on FIG. 6, can be used with the invention. Especially the structure of the first pipeline stage P1 can vary in different embodiments.

Yet another advantageous embodiment of the invention is based on the observation that if the temporal value of the current SAD value already exceeds the so far found minimum SAD value for the current X data, there is no need to complete computation of the current SAD. A second interrupt signal 18 acting similarly to the first interrupt signal 17 will be used.

To generate the second interrupt signal the third P3 and fourth P4 pipeline stages operate in parallel with the first P1 and the second P2 pipeline stages but, possibly, with different clock frequencies C1, C2 since the last two pipeline stages P3, P4 may be slower and need not operate at every operating step. With these modifications, partial SAD values will be formed at the output of the adder 12 at the third pipeline stage P3 every T basic operating steps (corresponding to the clock frequency C1) of the first two pipeline stages P1, P2, where T is the ratio between the clock frequency C1 of the first two pipeline stages P1, P2 and the clock frequency C2 of the last two pipeline stages P3, P4. The minimum evaluator 13 compares the partial SAD values with the current minimum SAD value every T basic operating steps. At that basic operating step when it is known that the current partial SAD value is, in fact, a final SAD value the minimum SAD value is replaced if it is larger than the current SAD value. Before that clock cycle the minimum SAD value is not replaced even if the partial SAD value is smaller than the minimum value. However, if the partial SAD value is larger than the current minimum SAD value the second interrupt signal 18 is set to active. Similar to the first interrupt signal 17 the second interrupt signal 18 resets the SAD calculation means 1 and activates the Y data address generator 24 in order to start computation of the current X data with the next Y data.

It should be noted here, that in addition to a clear improvement in execution time when using the above described embodiment, there is also an advantage of power/energy saving due to making the last two pipeline stages operate with a slower clock frequency.

In still another advantageous embodiment of the present invention the third interrupt signal 19 may be used to interrupt the SAD calculation process for the current search area. This embodiment is based on the observation that computations of the SAD values between the current X block and the rest of Y blocks are not needed if the SAD value between current X and Y blocks is sufficiently small (smaller than a predetermined second threshold value TH2).

To handle such a situation another interrupt signal (the third interrupt signal 19) is formed by the fourth pipeline stage P4. To generate the third interrupt signal 19 the fourth pipeline stage P4 advantageously comprises a register (not shown) for the second threshold value TH2 and a comparator (not shown) to compare the current (final) SAD value with the second threshold value. If the (final) SAD value is smaller than the second threshold value the third interrupt signal 19 will be activated. This third interrupt signal 19 is coupled with the first interrupt signal 17 in the second OR gate 21, with the second interrupt signal 18 in the first OR gate 20 and with original reset signal 41 in the third OR gate 22 in order to form the new reset signal. The third interrupt signal 19 is also coupled to both X and Y data address generators 23, 24 in order to make them sending new data. The new data can comprise e.g. a new (unexamined) block $X^{(\tilde{c})}$ of said frame FR1 to be encoded, which is selected as the current video block comprising data values $\{\hat{x}_1, \ldots, \hat{x}_K\}$ (not shown), and a block $Y^{(\tilde{c},\hat{r})}$ of another video frame comprising data values ($\{\hat{y}_1, \ldots, \hat{y}_K\}$) (not shown). An example of these blocks $X^{(\tilde{c})}$, $Y^{(\tilde{c},\hat{r})}$ are also shown in FIG. 5.

Clearly the present invention will lead to significant improvements in gate count, power consumption and execution time. However, quantitative estimation of the savings is difficult since they depend on the video sequence, on motion estimation algorithm, and on the realization of the invention.

After the comparison, if no interrupt signals were generated, it is examined if all reference blocks have been used for calculating the SAD values for the current block $X^{(c)}$. If there still exists at least one reference block $Y^{(c,r)}$, $Y^{(c,r')}$ which is not yet used in the calculation of the SAD value for the current block, above described procedures are repeated. Otherwise, the found minimum SAD value will be used in later stages of the video encoding process to determine, if the current block will be encoded as such or motion compensated. The minimum evaluator 13 determines the coordinates of the block which produced the minimum SAD value for the current block and advantageously transfers the coordinate information together with the minimum SAD value to the decision means, e.g. the control unit 26. In the decision means the minimum SAD value is examined to determine if the current block will be encoded as such or motion compensated. The decision means can, for example, evaluate the amount of information which is needed to transfer the block and the amount of information which is needed to transfer the motion compensated information. Then, the decision means advantageously select that alternative which needs less information transfer capacity.

In a situation in which the motion compensated information is selected to be transmitted instead of the block itself, transmitted information comprise advantageously at least the coordinate information and motion error information. The coordinate information is used to inform the decoder which previously received and decoded reference block was used to form the motion vector. The motion error information is the difference between respective pixel values of the current block and the reference block. The decoder can then form the image information of the current block by using said reference block corrected by the motion error information.

Figure 3:
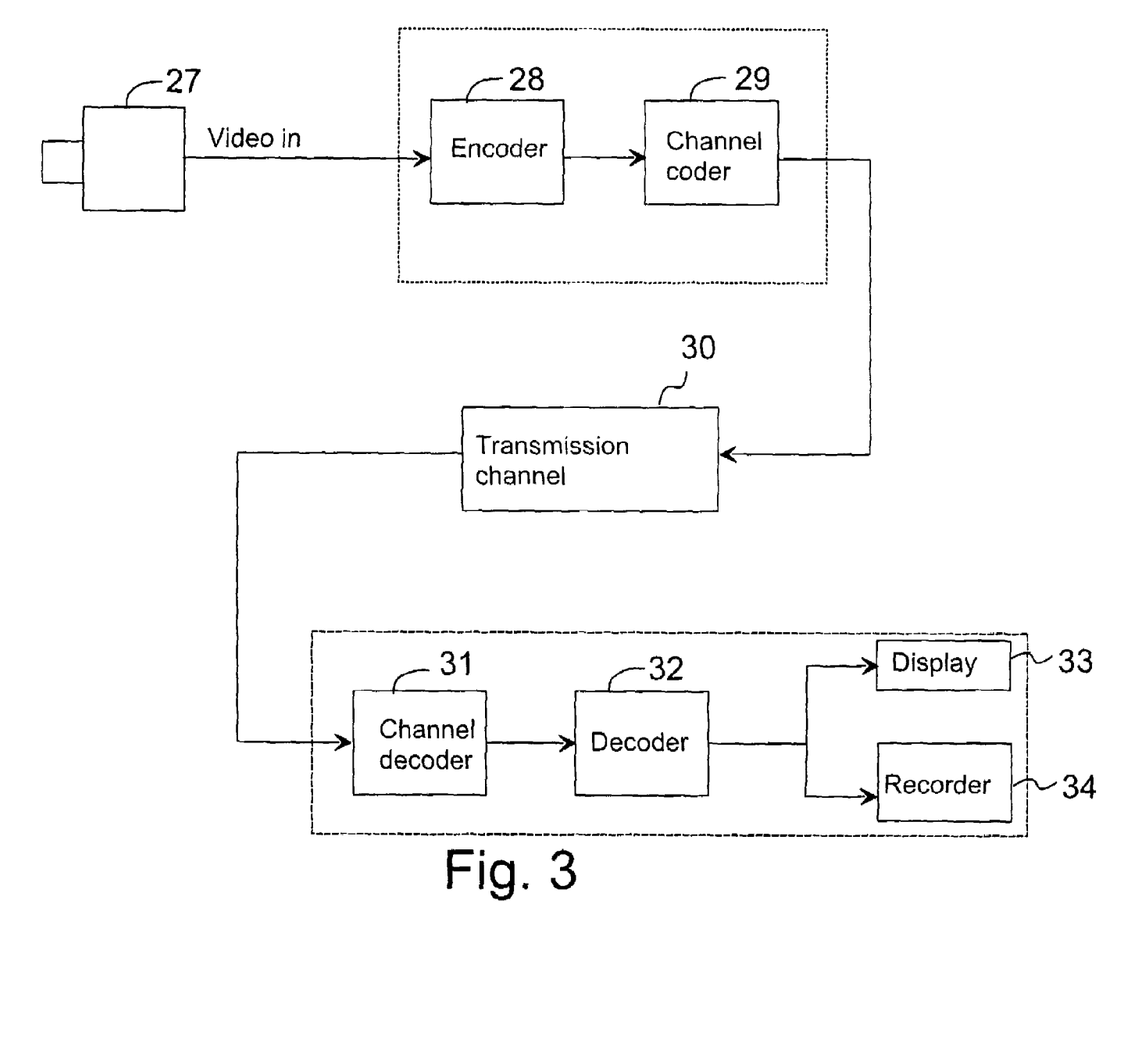
FIG. 3 shows, in a reduced block diagram, a video transmission system according to an advantageous embodiment of the invention.

Next, a video transmission system according to an advantageous embodiment is described with reference to the block diagram of FIG. 3. The video signal to be transmitted is taken e.g. by the video camera 27 or it can be retrieved from video storing means (not shown) such as video recorder, digital versatile disk (DVD) etc. The video signal is transferred to the encoder 28, which performs the coding of the video signal including the motion estimation according to the present invention. The encoded video signal is then channel coded in the channel coder 29, if necessary. The purpose of the channel coding is to transform the coded video signal into a form suitable for transmission via the transmission channel 30. The details of the channel coding can vary in different implementations of the video coding system and they are known by a skilled person.

In the receiver the channel coded video signal is channel decoded in channel decoder 31 to retrieve the encoded video signal. After that, the decoder 32 decodes the video signal to produce a video signal which should substantially correspond with the original signal. However, in practice there are some potential error sources which can affect the transferred video signal wherein the decoded video signal may differ from the original video signal. Error correction mechanisms are developed to minimize effects of such transmission errors.

The decoded video signal can then be displayed on the video monitor 33 and/or it can be stored into the storing means 34.

Figure 4:
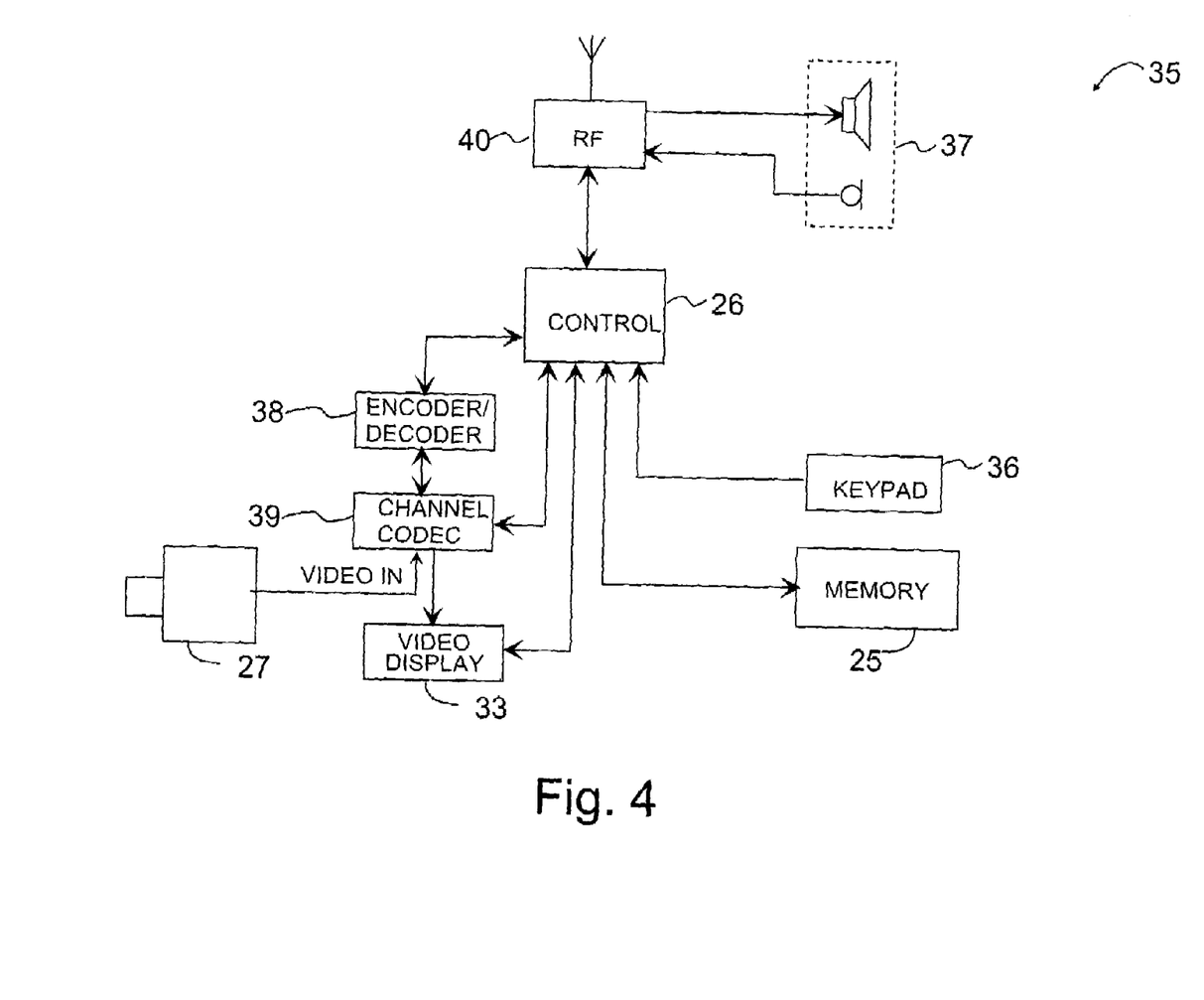
FIG. 4 shows, in a reduced block diagram, a communication device according to an advantageous embodiment of the invention.

The FIG. 4 presents the video encoding device 35 according to an advantageous embodiment of the invention in a reduced manner. The terminal in question is suitable for both transmitting and receiving, but the invention can also be applied in connection with simplex terminals. In the video encoding devices 35 all the functional features presented in the block diagram of FIG. 4 are not necessarily required, but within the scope of the invention it is also possible to apply simpler video encoding devices 35, for example without keyboard 36 and audio means 37. In addition to said keyboard 36 and audio means 37, the video terminal also comprises video means, such as a video monitor 33, a video camera 27 or the like.

To control the functions of the video encoding device 35, it comprises a control unit 26, which comprises, for example, a micro controlling unit (MCU), a micro processing unit (MPU), a digital signal processor and/or the like. In addition, the control unit 26 contains memory means 25 e.g. for storing application programs and data, and bus interface means I/O for transmitting signals between the control unit 26 and other functional blocks. The video encoding device 35 also comprises a video codec 38 which perform the encoding/decoding and compression/decompression of the video information. The compression is e.g. based on DCT transform and quantization, wherein in a decompression phase, the received information is dequantized and inverse DCT transformed, known as such. A channel codec 39 performs the channel coding for information to be transmitted and channel decoding of received information. The transmission of the channel coded video signal can be performed by e.g. the mobile communication means 40.

Each of the above described embodiments can be applied independently to the SAD calculation unit 1 to improve its performance, so that any of the embodiments can be combined to enhance the effect of the improvement. It should be clear to a skilled person that the presented methods for incorporating early termination mechanisms can also be applied to other iterative accumulation SAD architectures, for example those generally presented on FIG. 6.

Is should also be noted that the threshold values which are used in comparisons to generate an interrupt signal need not be predetermined but they can also be dynamic, i.e. they can be changed during the operation of the SAD calculation device 1. For example, the second interrupt signal is generated if the temporal value of the current SAD value already exceeds the so far found minimum SAD value for the current X data. Therefore, the so far found minimum SAD value which is used as a threshold value for the second interrupt may change during the operation of the device 1.

It is obvious that the present invention is not limited solely to the above-presented embodiments, but it can be modified within the scope of the appended claims.

The invention claimed is:

1. A method for performing video motion estimation in video encoding, in which a video signal consists of frames comprising blocks, a combined comparison value is formed by using a current video block of a frame to be encoded and at least one other video block of another frame, said current video block of the frame to be encoded comprises a set of first data values, said at least one other video block of another frame comprises a set of second data values, data value pairs are formed of data values from said set of first data values and equal number of corresponding data values from said set of second data values, and said combined comparison value is formed by defining comparison values, each of which is defined by using data values of one data value pair of said data value pairs, at least one threshold value is defined, and it is determined whether the process for defining said combined comparison value can be terminated, wherein the method comprises at least:
   a calculation step for forming at least one sub-set of comparison values each consisting of at least one comparison value,
   an accumulation step for forming a signal indicative of the current cumulative comparison value, which is updated iteratively using said at least one sub-set of comparison values obtained at the calculation step.
   a decision step performing the determination whether the process can be terminated by comparing at least one signal with at least one threshold value, and
   termination and initialisation of a new process for defining said combined comparison value according to the decision made at the decision step.

2. A method according to claim 1, wherein a first threshold value is defined, and that after each accumulation step the decision step is performed to determine, if the signal exceeds the first threshold value, wherein the calculation process is terminated and a new SAD calculation process is initialised if the signal exceeds the first threshold value.

3. A method according to claim 1, wherein a comparison value is defined by calculating a difference between a first value and a second value of a data value pair.

4. A method according to claim 1, wherein the cumulative comparison value consists of a sum and a carry term, wherein said signal is indicative of the carry term.

5. A method according to claim 1, wherein said cumulative comparison value is formed by summing at least two comparison values, and that the cumulative comparison value is compared with a previously obtained combined comparison value between the current block and another block or with a predetermined number to determine it the calculation process can be terminated.

6. A method according to claim 5, wherein if said cumulative comparison value is greater than said previously obtained combined comparison value or said predetermined number, the calculation process is terminated.

7. A method according to claim 1, wherein if it is determined that the calculation process can be terminated, a new block of said another frame is selected for the calculation of comparison values using data values of said current video block and data values of said new video block, and that the calculation of comparison values using data values of said current video block and data values of said new video block is started.

8. A method according to claim 1, wherein a second threshold value is determined, that one signal is formed by using combined comparison value of all comparison values of all value pairs of said set of first data values and said set of second data values, and that said one signal is compared with said third threshold value to determine if the calculation process can be terminated.

9. A method according to claim 8, wherein if the combined comparison value is less than said second threshold value, the calculation process is terminated.

10. A method according to claim 7, wherein if it is determined that the calculation process can be terminated, said block of another frame is selected to be used in forming motion estimation information for said current block, wherein the calculation of comparison values for the current video block is stopped.

11. A method according to claim 7, wherein if it is determined that the calculation process can be terminated, a new block of said frame to be encoded is selected as the current video block, and that the calculation of difference between data values of said current video block and data values of a block of another video frame is started.

12. A system for performing video motion estimation in video encoding, in which a video signal consists of frames comprising blocks, the system comprising means for forming a combined comparison value by using a current video block of a frame to be encoded and at least one other video block of another frame, said current video block of the frame to be encoded comprises a set of first data values, said at least one other video block of another frame comprises a set of second data values, said means for forming a combined comparison value comprise input means for entering a series of at least two subsets each consisting of equal number of data value pairs of data values from said set of first data values and equal number of corresponding data values from said set of second data values, means for defining comparison values, each of which is defined by using data values of one data value pair of said data value pairs, means for defining at least one first threshold value, and means for determining whether the process for defining said combined comparison value can be terminated, the system further comprising at least:
   calculation means for forming at least one sub-set of comparison values each consisting of at least one comparison value,
   accumulation means for forming a signal indicative of the current cumulative comparison value, which is updated iteratively using said at least one sub-set of comparison values obtained at the calculation step,
   decision means for determining whether the calculation process can be terminated comprise means for comparing at least one signal with at least one threshold value, and
   means for terminating the current process and initialising of a new process for defining said combined comparison value according to the decision made at the decision step.

13. A system according to claim 12, wherein the calculation precision of said accumulation means and said decision means is lower than necessary to obtain the largest possible SAD value correctly.

14. A video encoding device, which comprises means for encoding a video signal consisting of frames comprising blocks, means for performing video motion estimation, means for calculating a combined comparison value between a current video block of a frame to be encoded and at least one other video block of another frame, said current video block of the frame to be encoded comprises a set of first data values, said at least one other video block of another frame comprises a set of second data values, and said combined comparison value is formed by defining comparison values between value pairs of said set of first data values and said set of second data values, means for defining at least one threshold value, and means for determining whether the process for defining said combined comparison value can he terminated, the device further comprising at least:

calculation means for forming at least one sub-set of comparison values each consisting of at least one comparison value, accumulation means for forming a signal indicative of the current cumulative comparison value, which is updated iteratively using said at least one sub-set of comparison values obtained at the calculation step, decision means for determining whether the calculation process can be terminated comprise means for comparing at least one signal with at least one threshold value, and means for terminating the current process and initialising of a new process for defining said combined comparison value according to the decision made at the decision step.

15. A device according to claim 14, wherein it comprises means for performing mobile communication.

16. An apparatus comprising:
at least one calculation module for forming a combined comparison value by using a current video block of a frame to be encoded and at least one other video block of another frame, wherein the frames are of a video signal comprising frames comprising blocks, wherein the current video block of the frame to be encoded comprises a set of first data values, the at least one other video block of another frame comprises a set of second data values, wherein the at least one calculation module is configured to form a combined comparison value and comprises an input for entering a series of at least two subsets each comprising equal number of data value pairs of data values from the set of first data values and equal number of corresponding data values from the set of second data values, an accumulation module for defining comparison values, each of which is defined by using data values of one data value pair of the data value pairs, an evaluation module for defining at least one first threshold value, and a termination module for determining whether the process for defining the combined comparison value can be terminated, wherein:

the at least one calculation module is configured to form at least one sub-set of comparison values each comprising at least one comparison value, the accumulation module is configured to form a signal indicative of the current cumulative comparison value, which is updated iteratively using the at least one sub-set of comparison values obtained from the at least one calculation module, the evaluation module is configured to generate an output if it is determined that the calculation process can be terminated by comparing at least one signal with at least one threshold value, and the termination module is configured to terminate the current process and initialise a new process for defining the combined comparison value according to the output of the evaluation module.

17. The apparatus of claim 16, wherein the calculation precision of the accumulation module and the evaluation module is lower than necessary to obtain the larger possible sum of absolute difference value correctly.

18. The apparatus of claim 16, further comprising a communication module configured to perform mobile communication.

19. The apparatus of claim 16, wherein the accumulation module comprises a compression array and an adder.

20. The apparatus of claim 16, wherein the evaluation module comprises an evaluator.

21. The apparatus of claim 16, wherein the termination module comprises an OR type logic gate.

22. A method comprising:
forming a combined comparison value by using a current video block of a frame to be encode of a video signal and at least one other video block of another frame; wherein the current video block of the frame to be encoded comprises a set of first data values, the at least one other video block of another frame comprises a second set of data values;

forming data value pairs of data values from the set of first data values and an equal number of corresponding data values from the set of second data values;

defining comparison values by using data values of one data value pair of the data value pairs;

defining at least one threshold value;

forming at least one sub-set of comparison values each consisting of at least one comparison value;

forming a signal indicative of the current cumulative comparison value, which is updated iteratively using the at least one sub-set of comparison values obtained at the calculation step;

determining whether the current process can be determined by comparing at least one signal with at least one threshold value; and terminating the current process and initializing a new process for defining the combined comparison value according to the comparison of at least one signal with at least one threshold value.

23. The method according to claim 22, wherein a first threshold value is defined, and if the signal exceeds the first threshold value the current process is terminated and a new process is initialized.

24. The method according to claim 22, wherein a comparison value is defined by calculating a difference between a first value and a second value of a data value pair.

25. The method according to claim 22, wherein the cumulative comparison value consists of a sum and a carry term, and wherein the signal is indicative of the carry term.

26. The method according to claim 22, wherein the cumulative comparison value is formed by summing at least two comparison values, and that the cumulative comparison value is compared with a previously obtained combined comparison value between the current block and another block or with a predetermined number to determine if the current process can be terminated.

27. The method according to claim 26, wherein if the cumulative comparison value is greater than the previously obtained combined comparison value or the predetermined number, the current process is terminated.

28. The method according to claim 22, wherein if it is determined that the calculation process can be terminated, the block of another frame is selected for the calculation of comparison values using data values of the current video block and data values of the new video block, and that the calculation of comparison values using data values of the current video block and data values of the new video block is started.

29. The method according to claim 22, wherein a second threshold value is determined, wherein said signal is formed by using combined comparison values of all comparison values of all value pairs of the set of first data values and the second of second data values, and wherein said signal is compared with the second threshold value to determine if the current process can be terminated.

30. The method according to claim 29, wherein if the combined comparison value is less than the second threshold value, the calculation process is terminated.

31. The method according to claim 28, wherein if it is determined that the current process can be terminated, the block of another frame is selected to be used in forming motion estimation information for the current block, wherein the calculation of comparison values for the current video block is stopped.

32. The method according to claim 28, wherein if it is determined that the current process can be determined, a new block of the frame to be encoded is selected as the current video block, and that the calculation of difference between data values of the current video block and data values of a block of another video frame is started.

33. An apparatus comprising:
at least one means for forming a combined comparison value by using a current video block of a frame to be encoded and at least one other video block of another frame,
wherein the frames are of a video signal comprising frames comprising blocks,
wherein the current video block of the frame to be encoded comprises a set of first data values, the at least one other video block of another frame comprises a set of second data values,
wherein the at least one means for forming a combined comparison value comprises means for entering a series of at least two subsets each comprising equal number of data value pairs of data values from the set of first data values and equal number of corresponding data values from the set of second data values,
means for defining comparison values, each of which is defined by using data values of one data value pair of the data value pairs,
means for defining at least one first threshold value, and
means for determining whether the process for defining the combined comparison value can be terminated, wherein:
the at least one means for forming a combined comparison value is for forming at least one sub-set of comparison values each comprising at least one comparison value,
the means for defining comparison values is for forming a signal indicative of the current cumulative comparison value, which is updated iteratively using the at least one sub-set of comparison values obtained from the at least means for forming a combined comparison value,
the means for defining at least one first threshold value is for generating an output if it is determined that the calculation process can be terminated by comparing at least one signal with at least one threshold value, and
the means for determining whether the process for defining the combined comparison value can be terminated is for terminating the current process and initializing a new process for defining the combined comparison value according to the output of the evaluation module.

34. The apparatus of claim 33, further comprising means for performing mobile communication.

* * * * *

UNITED STATES PATENT AND TRADEMARK OFFICE
CERTIFICATE OF CORRECTION

| | | |
|---|---|---|
| PATENT NO. | : 7,236,523 B2 | Page 1 of 1 |
| APPLICATION NO. | : 10/232924 | |
| DATED | : June 26, 2007 | |
| INVENTOR(S) | : Guevorkian et al. | |

It is certified that error appears in the above-identified patent and that said Letters Patent is hereby corrected as shown below:

At column 15, line 33, claim 1, line 24, please delete the "." after the word "step" and insert --,--.

At column 15, line 57, claim 5, line 6, please replace the word "it" with --if--.

At column 17, line 12, claim 14, line 15, please replace the word "he" with --be--.

Signed and Sealed this

Twentieth Day of November, 2007

JON W. DUDAS
*Director of the United States Patent and Trademark Office*